United States Patent [19]
Homma

[11] Patent Number: 6,125,239
[45] Date of Patent: Sep. 26, 2000

[54] VIEWFINDER DEVICE ENABLING DISPLAY OF OPTIONAL PHOTOGRAPHIC INFORMATION

[75] Inventor: Itaru Homma, Tokyo, Japan

[73] Assignee: Nikon Corporation, Tokyo, Japan

[21] Appl. No.: 09/162,143

[22] Filed: Sep. 29, 1998

[30] Foreign Application Priority Data

Sep. 30, 1997 [JP] Japan ................................. 9-281163

[51] Int. Cl.⁷ .......................... G03B 17/20; G03B 13/16; G03B 13/24
[52] U.S. Cl. ..................... 396/296; 396/147; 396/150; 396/384; 396/386
[58] Field of Search ................... 396/148, 149, 396/296, 373, 377, 378, 379, 380, 381, 384, 385, 386, 150, 152; 359/565, 566, 567

[56] References Cited

U.S. PATENT DOCUMENTS 4,200,380  4/1980  Sato et al. .................... 396/296 X
4,576,458  3/1986  Cho et al. .................... 396/296 X

*Primary Examiner*—Alan A. Mathews

[57] ABSTRACT

A viewfinder device that includes a screen on which an image is projected, and an eyepiece lens through which the image is viewed. An optical member passes light beams from the screen to the eyepiece lens through an information display member, and a diffraction optical element diffracts light beams in the direction of the eyepiece lens so that diffracted light beams from the information display member are superposed over the viewed image.

20 Claims, 6 Drawing Sheets

VIEWFINDER DEVICE ENABLING DISPLAY OF OPTIONAL PHOTOGRAPHIC INFORMATION

CROSS-REFERENCE TO RELATED APPLICATIONS

This application is based upon and claims priority of Japanese Patent Application No. 09-281163, filed Sep. 30, 1997, the contents being incorporated herein by reference.

BACKGROUND OF THE INVENTION

The present invention relates to a camera, and in particular, the present invention relates to a viewfinder of a single lens reflex ("SLR") camera.

Viewfinders of single lens reflex cameras which display various types of information superposed on a subject image on a screen are generally known. The information is displayed using a guest-host system, or similar liquid crystal display positioned adjacent to a screen surface, or by irradiating light from a light emitting diode ("LED"), or similar device, to a microprism adjacent to the screen surface and displaying the resulting reflected light.

Since both the liquid crystal display and the microprism must be located between the screen surface and a pentaprism of the viewfinder, the amount of available space between the screen surface and the pentaprism is limited. Given the limit in available space, and since both the liquid crystal display and microprism are relatively thick, designing a viewfinder that utilizes a liquid crystal display and a microprism has proven to be difficult.

In addition, while irradiating light from an LED onto the microprism results in a clear illumination of a display in the viewfinder, flare tends to originate in light diffused by the microprism, corrupting the display. In order to prevent such flare from occurring, it is necessary to employ additional elements, such as a screen surface or a Fresnel lens as a condenser. Nevertheless, because the screen tends to be positioned within relative close proximity to the display portion, diffusion of light beams inevitably occurs, making it difficult to design a viewfinder that prevents flare from occurring.

Furthermore, since the display can typically be changed only by activating an ON-OFF portion of a preset button, the information which can be displayed is limited to photographic information related to an autofocus operation.

BRIEF SUMMARY OF THE INVENTION

It is therefore an object of the present invention to provide a viewfinder device that enables various optional photographic information to be displayed in a viewfinder without increasing necessary dimensions of an optical element.

It is a further object of the present invention to provide a viewfinder device that prevents the occurrence of flare caused by an optical element.

Objects of the invention are achieved by a viewfinder device that includes a screen on which an image is projected, an eyepiece lens through which the image is viewed, and a display member to emit light beams. An optical member transfers the light beams from the screen to the eyepiece lens, and a diffraction optical element diffracts the light beams emitted by the display member towards the eyepiece lens so that diffracted light beams are superposed over the viewed image.

Further objects of the invention are achieved by a viewfinder device that includes a screen on which an image is projected, an eyepiece lens through which the image is viewed, and an optical member to transfer light beams from the screen to the eyepiece lens. A display member emits light beams to display photographic information, and a diffraction optical element, positioned in a light path between the screen and the eyepiece lens, diffracts the light beams emitted by the display member towards the eyepiece lens, so that the diffracted light beams from the display member are superposed over the viewed image.

Further objects of the invention are achieved by a camera having a viewfinder device that includes a screen on which an image is projected, an eyepiece lens through which the image is viewed, and a display member to emit light beams. A pentaprism transfers light beams from the screen to the eyepiece lens, and has a first surface which reflects light beams, and a second surface positioned adjacent to the eyepiece lens. A diffraction optical element which diffracts the light beams emitted by the display member towards the eyepiece lens, is positioned adjacent to the second surface of the pentaprism and the display member is positioned adjacent to the first surface of the pentaprism.

Still further objects of the invention are achieved by a lens shutter camera that has a viewfinder device through which a photographer views a photographic subject. The lens shutter camera includes a lens unit to focus the photographic subject and a display member to emit light beams to display photographic information. Light beams of the focused photographic subject are viewed through an eyepiece lens. A holographic optical element, in an inclined position between the eyepiece lens and the lens unit, diffracts light beams of the display member so that the diffracted light beams are superposed over the viewed light beams of the focused photographic subject.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
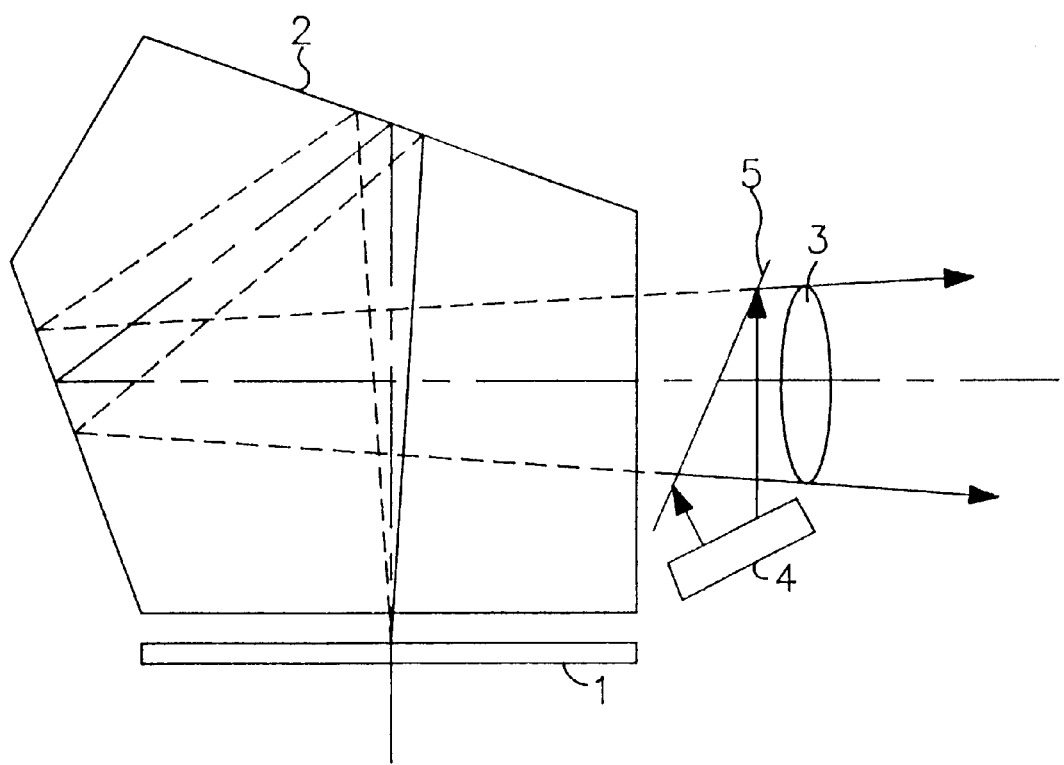
FIG. 1 is a schematic view of a viewfinder device according to a preferred embodiment of the present invention.

Reference will now be made in detail to the preferred embodiments of the present invention, examples of which are illustrated in the accompanying drawings, wherein like reference numerals refer to like elements throughout.

A viewfinder device according to a first preferred embodiment of the present invention is illustrated in FIG. 1. A screen 1 is located in a position conjugate to a surface of a silver salt film, or similar photosensitive medium (not shown). An image of a photographic subject is formed on the silver salt film, when not exposed, and projected onto screen 1, reflected by a quick return mirror. The image of the photographic subject is transferred by a pentaprism 2, or other similar optical element, from the surface of screen 1 to an eyepiece unit through an eyepiece lens 3.

A light beam from an information display element 4 that emits light beams, such as a liquid crystal display ("LCD"), is diffracted towards eyepiece lens 3 as if generated from screen 1 by a diffraction optical element 5. In a viewfinder device according to a preferred embodiment of the present invention, diffraction optical element 5 is a holographic optical element ("HOE"). The light beams emitted by information display element 4 correspond to photographic information so that a photographer can see the photographic information displayed in information display element 4, superposed on the subject image projected onto screen 1.

During operation, a photographer sees the photographic subject imaged on screen 1 through eyepiece lens 3. At the same time, light beams from information display element 4 are diffracted towards eyepiece lens 3 by diffraction optical element 5 so that it appears as though the light beams from information display element 4 also originated from screen 1. As a result, the photographer sees the light beams from information display element 4 superposed on the photographic image through the viewfinder device. In this way, diffraction optical element 5 diffracts the light beams from information display element 4 to produce a virtual image of photographic information of information display element 4 on screen 1.

Figure 2A:
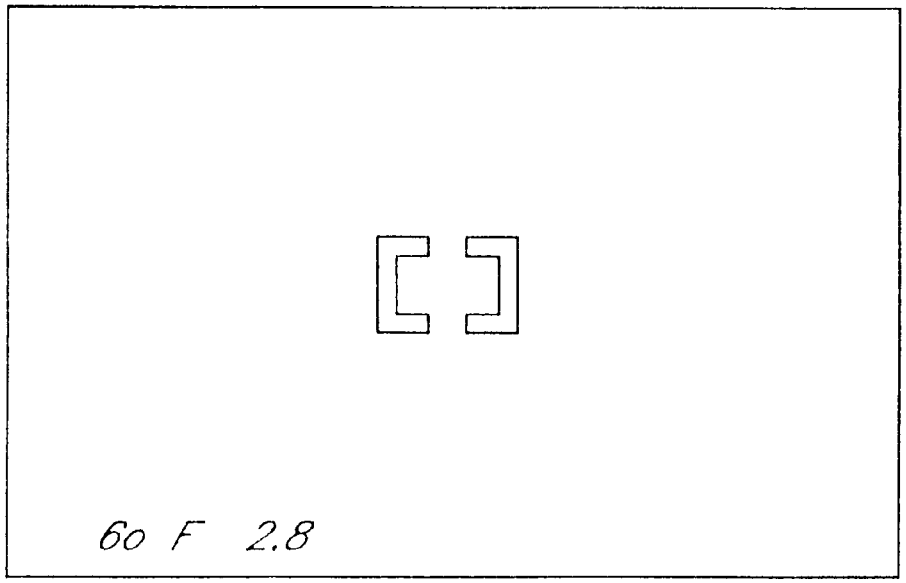
FIGS. 2A and 2B are planar views of information displayed on a liquid crystal display element according to an embodiment of the present invention.
Figure 2B:
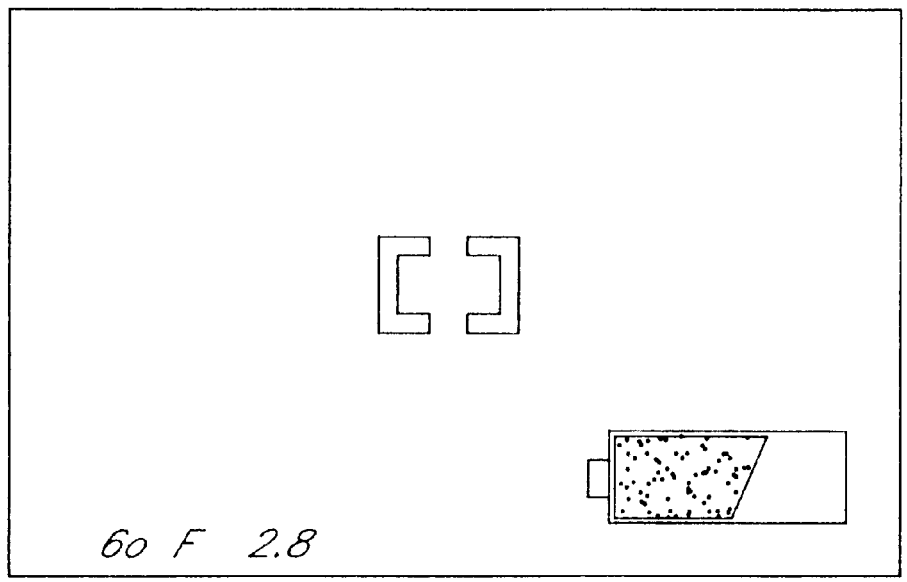

An example of the photographic information which is displayed by information display element 4 is illustrated in FIG. 2A and FIG. 2B. FIG. 2A illustrates an example of an autofocus operation displayed in a center of a photographic region, and an exposure time and an aperture value displayed in a peripheral portion of the photographic region. FIG. 2B illustrates a low battery warning which is displayed in addition to the display of FIG. 2A.

Figure 3:
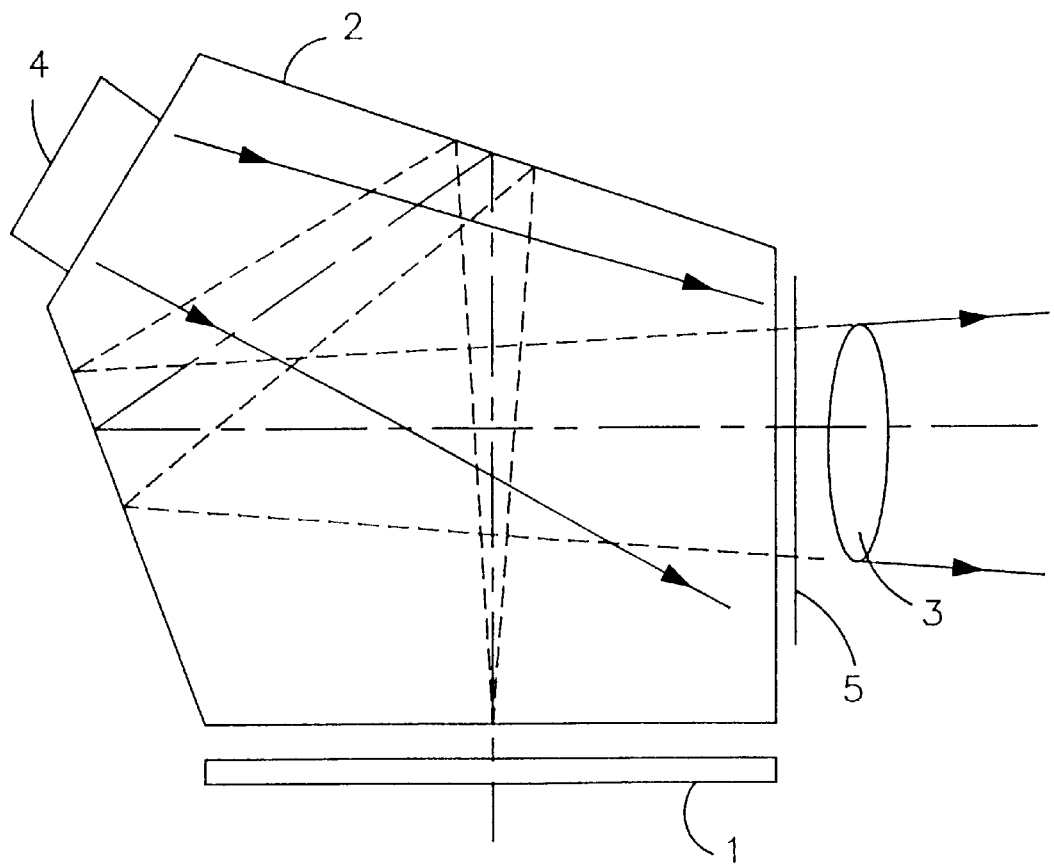
FIG. 3 is a schematic view of a viewfinder device according to a second preferred embodiment of the present invention.

A viewfinder device according to a second preferred embodiment of the present invention is illustrated in FIG. 3. The second preferred embodiment differs from the first preferred embodiment in that information display element 4 is positioned in a plane that does not contribute to reflection or passage of light beams of pentaprism 2. As a result, the difficulty of inserting information display element 4 and diffraction optical element 5 within a narrow space between pentaprism 2 and eyepiece lens 3 is reduced. In addition, a distance between information display element 4 and diffraction optical element 5 can be somewhat reduced, and therefore a diffraction angle of diffracted light, or light beams facing toward eyepiece lens 3, must not be too large with respect to incident light, or light beams from information display element 4. When the diffraction angle is excessively large, design of diffraction optical element 5 becomes difficult, and may result in aberration, or similar problems. In this way, when the diffraction angle of the diffracted 8 light is controlled, it is possible to manufacture an effective diffraction optical element 5 with a relatively small optical burden.

Figure 4:
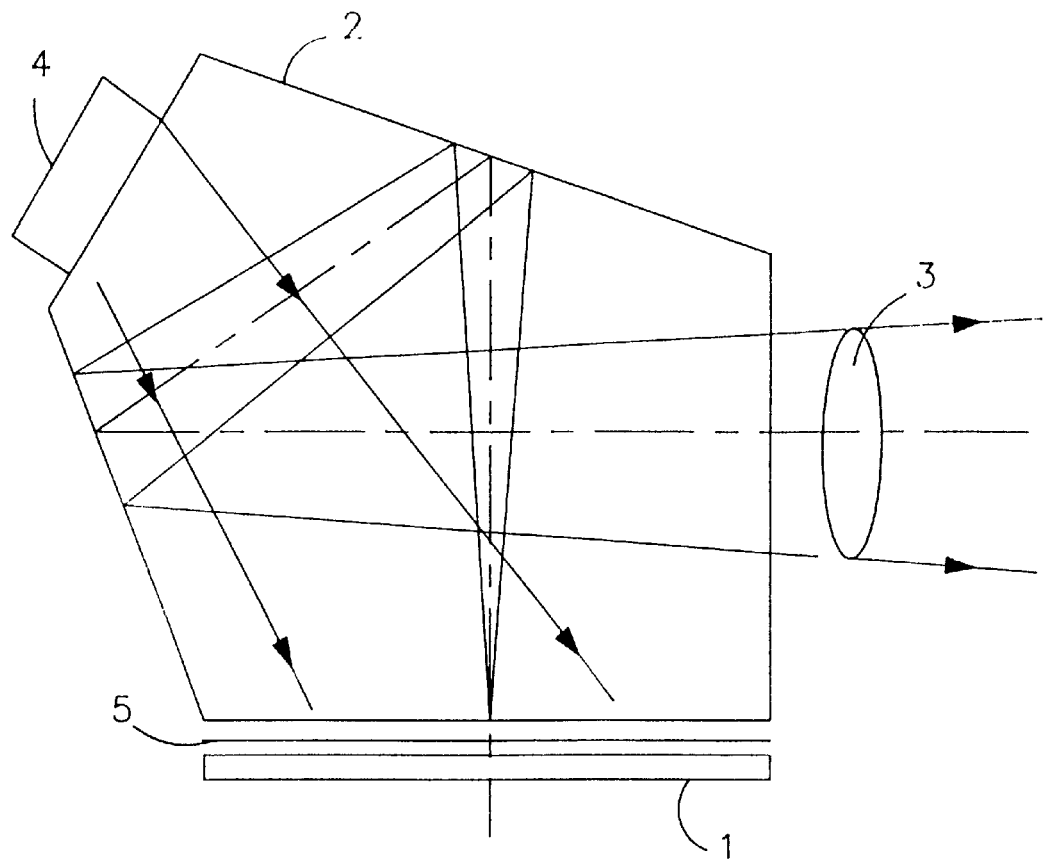
FIG. 4 is a schematic view of a viewfinder device according to a third preferred embodiment of the present invention.

A viewfinder device according to a third preferred embodiment of the present invention is illustrated in FIG. 4. As illustrated in FIG. 4, diffraction optical element 5 is positioned within a space between screen 1 and pentaprism 2. Since diffraction optical element 5 has a thin, film-like form, a liquid crystal element, or a microprism can be relatively easily positioned in the space.

Figure 5:
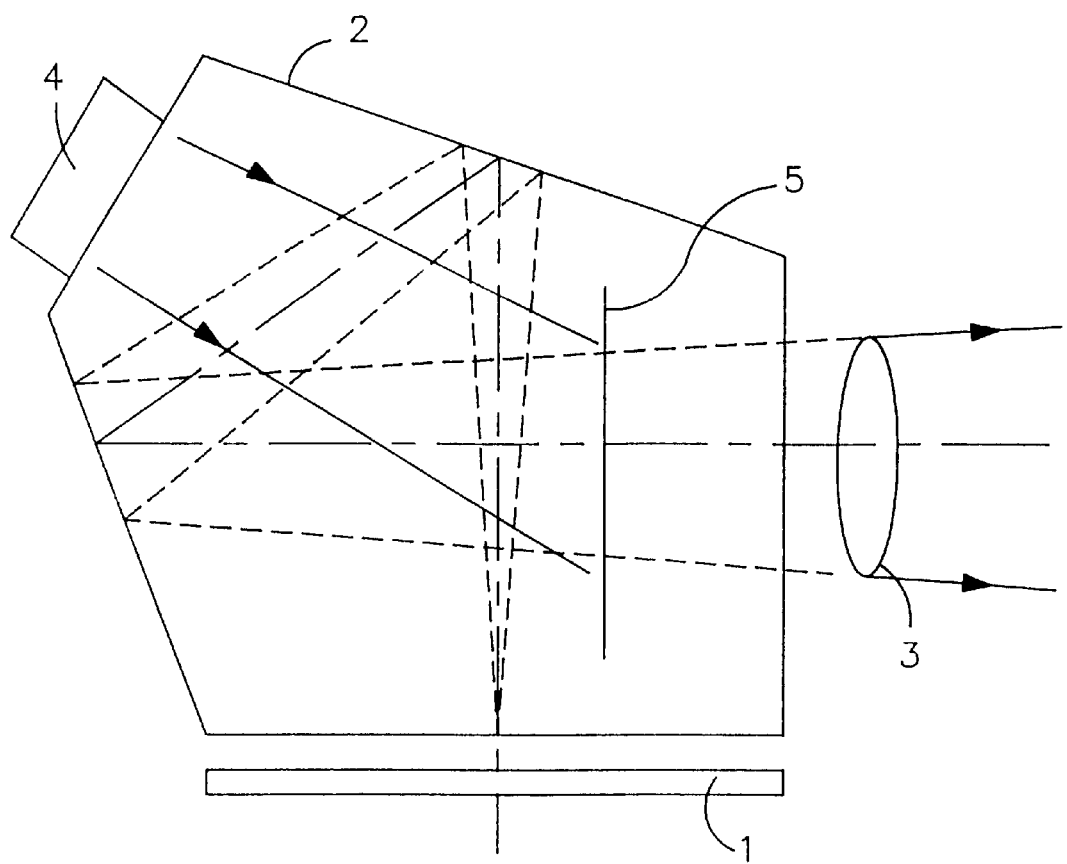
FIG. 5 is a schematic view of a viewfinder device according to a fourth preferred embodiment of the present invention.

A viewfinder device according to a fourth preferred embodiment of the present invention is illustrated in FIG. 5. According to the fourth preferred embodiment, diffraction optical element 5 is positioned within a space within pentaprism 2, as illustrated in FIG. 5.

Figure 6:
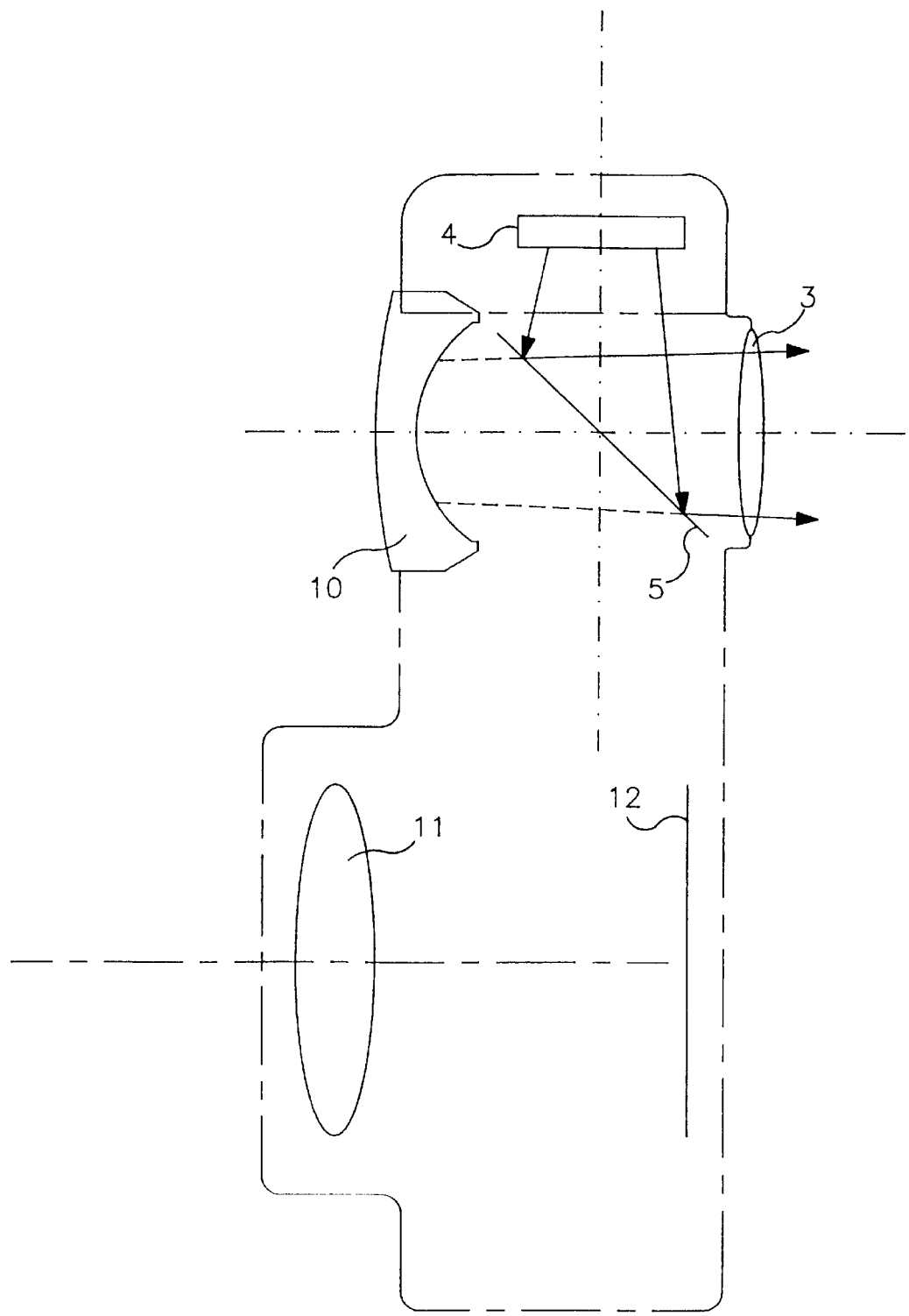
FIG. 6 is a cross-sectional view of a viewfinder device according to a sixth preferred embodiment of the present invention.

A viewfinder device of a lens shutter camera according to a sixth preferred embodiment of the present invention is illustrated in FIG. 6. As illustrated in FIG. 6, diffraction optical element 5, which according to the sixth preferred embodiment is a holographic optical element, is located in an inclined position between eyepiece lens 3 and a lens 10, and positioned above a lens 11 and a film 12. Diffraction optical element 5 diffracts display light beams from information display element 4. Display light beams of information display element 4 which are diffracted by diffraction optical element 5 are superposed on light beams of a photographic image, or a photographic object passing through eyepiece lens 3. As a result, a photographer can see a display content of information display element 4 and the photographic image.

According to a preferred embodiment of the present invention, information display element 4 may be a liquid crystal display ("LCD"), or similar device, which displays information pertaining to other photographic features in addition to autofocus operation. For example, exposure information may also be periodically displayed in the viewfinder. In particular, according to the preferred embodiments of the present invention, "low battery" and similar displays, which are typically displayed outside of a photographic field frame in conventional camera systems, can be displayed superposed on the photographic image in a photographic field frame. Because photographic information, such as "low battery", can be displayed in the photographic field frame despite being centralized within the photographic image, the display can nonetheless be easily recognized.

In addition to being an LCD, according to preferred embodiments of the present invention, information display element 4 may also be a light emitting diode ("LED"). The LED may be positioned in an elevated flat state, with a display configuration of the LED illuminating from a back portion of a lamina member hollowed out in a display configuration.

By eliminating the need for using a microprism to display photographic information, it is no longer necessary to increase the size of the optical member, or pentaprism 2, in order to enable light beams from screen 1 to be transferred to eyepiece lens 3.

In a viewfinder device according to the preferred embodiments of the present invention, a diffraction angle, a diffraction efficiency, and the similar characteristics of diffraction optical element 5 can be optionally designed. Accordingly, the amount of freedom in choosing a position of diffraction optical element 5 is increased, and diffraction optical element 5 may be located anywhere on an optical path from screen 1 to eyepiece lens 3. According to a preferred embodiment of the present invention, optical member 2 is a pentaprism, and it is preferred that diffraction optical element 5 be located close to a surface of the pentaprism which is nearest to eyepiece lens 3, and that information display element 4 be located close to a surface of the pentaprism which reflects light beams, or is not transparent.

In a viewfinder device according to a preferred embodiment of the present invention, diffraction optical element 5 is preferably a holographic optical element, which functions like a lens, a prism, etc., and is a diffraction grating which records interference fringes and the like on a photographic plate. As a result, the lens, prism, etc. are no longer necessary for display purposes, and display of photographic information can be accomplished with a simple optical system that is relatively small in size.

According to preferred embodiments of the present invention, in addition to being a holographic optical element, diffraction optical element 5 may also be a binary optical element ("BOE"), or similar device. The BOE uses a diffraction phenomenon, and changes an optical path length and a travel direction of light. Finally, in a viewfinder device according to preferred embodiments of the present invention, a binary hologram or similar binary optical element represented by a computer hologram can be used as diffraction optical member 5. If a computer hologram is used, a diffraction angle and a distance between screen 1 and the hologram, or a virtual position, can be easily designed using a computer.

Using the viewfinder device according to the preferred embodiments of the present invention, it is possible to display various optional photographic information from an information display element superposed on a subject image in a viewfinder. Moreover, because a diffraction optical element is used, the size of an optical member, or pentaprism and the like is not increased. Furthermore, the occurrence of flare can easily be prevented, because the space between information display element 5 and screen 1 can be sufficiently maintained.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A viewfinder device, comprising:
   a screen on which an image is projected;
   an eyepiece lens through which the image is viewed;
   an optical member to transfer light beams from the screen to the eyepiece lens;
   a display member to emit light beams; and
   a diffraction optical element to diffract the light beams emitted by the display member towards the eyepiece lens, wherein diffracted light beams from the display member are superposed over the viewed image.

2. A viewfinder device according to claim 1, wherein the diffraction optical element is positioned in a light path between the screen and the eyepiece lens.

3. A viewfinder device according to claim 1, wherein the optical member is a pentaprism having a first surface which reflects light beams, and a second surface positioned adjacent to the eyepiece lens, and wherein the diffraction optical element is positioned adjacent to the second surface of the pentaprism, and the display member is positioned adjacent to the first surface of the pentaprism.

4. A viewfinder device according to claim 1, wherein the diffraction optical element is a holographic optical member.

5. A viewfinder device according to claim 4, wherein the holographic optical member is positioned between the screen and the optical member.

6. A viewfinder device of claim 4, wherein the optical member is a pentaprism, and the holographic optical member is positioned within the pentaprism.

7. A viewfinder according to claim 1, wherein the diffraction optical element is a binary optical member.

8. A viewfinder device according to claim 1, wherein the display member displays photographic information.

9. A viewfinder device according to claim 1, wherein the display member displays photographic information corresponding to an autofocus operation and an exposure operation.

10. A viewfinder device, comprising:
    a screen on which an image is projected;
    an eyepiece lens through which the image is viewed;
    an optical member to transfer light beams from the screen to the eyepiece lens;
    a display member to emit light beams to display photographic information; and
    a diffraction optical element, positioned in a light path between the screen and the eyepiece lens, to diffract the light beams emitted by the display member towards the eyepiece lens, wherein the diffracted light beams from the display member are superposed over the viewed image.

11. A viewfinder device according to claim 10, wherein the diffraction optical element is a holographic optical member.

12. A viewfinder device according to claim 10, wherein the diffraction optical element is a binary optical member.

13. A viewfinder device according to claim 10, wherein the photographic information corresponds to an autofocus operation and an exposure operation.

14. A camera having a viewfinder device, comprising:
    a screen on which an image is projected;
    an eyepiece lens through which the image is viewed;
    a pentaprism to transfer light beams from the screen to the eyepiece lens, and having
    a first surface which reflects light beams, and a second surface positioned adjacent to the eyepiece lens;
    a display member to emit light beams; and
    a diffraction optical element to diffract the light beams emitted by the display member towards the eyepiece lens, wherein the diffraction optical member is positioned adjacent to the second surface of the pentaprism and the display member is positioned adjacent to the first surface of the pentaprism.

15. A camera according to claim 14, wherein the diffraction optical element is a holographic optical member.

16. A camera according to claim 14, wherein the diffraction optical element is a binary optical member.

17. A camera according to claim 14, wherein the display member displays photographic information.

18. A camera according to claim 14, wherein the display member displays photographic information corresponding to an autofocus operation and an exposure operation.

19. A camera having a viewfinder device through which a photographer views a photographic subject, comprising:
    a lens unit to focus the photographic subject;
    an eyepiece lens through which light beams of the focused photographic subject are viewed;
    a display member emitting at least one light beam containing an image representing photographic information; and
    a holographic optical element, in an inclined position between the eyepiece lens and the lens unit, to diffract the at least one light beam of the display member, wherein the diffracted at least one light beam is superposed over the viewed light beams of the focused photographic subject.

20. A camera having a viewfinder to view an image, having an optical path between a screen on which the image is projected and an eyepiece lens through which the image is viewed, comprising:
    means for emitting at least one light beam containing an image representing photographic information; and
    means for diffracting the at least one light beam emitted by the emitting means to superpose the image representing photographic information over the viewed image, wherein the diffracting means is located at any position within the optical path.

* * * * *